United States Patent

[11] 3,607,336

| [72] | Inventor | Edward E. Jaffe |
|---|---|---|
| | | Union, N.J. |
| [21] | Appl. No. | 840,500 |
| [22] | Filed | July 9, 1969 |
| [45] | Patented | Sept. 21, 1971 |
| [73] | Assignee | E. I. du Pont de Nemours and Company |
| | | Wilmington, Del. |
| | | Continuation-in-part of application Ser. No. 738,784, June 21, 1968, now abandoned, which is a continuation-in-part of Ser. No. 515,251, Dec. 20, 1965 |

[54] PROCESS FOR MAKING SOLID SOLUTIONS
7 Claims, No Drawings

[52] U.S. Cl. ....................................................... 106/288 Q,
106/309
[51] Int. Cl. ....................................................... C08h 17/14
[50] Field of Search ........................................... 106/288 Q,
309

[56] References Cited
UNITED STATES PATENTS

| 2,844,484 | 7/1958 | Reidinger et al.............. | 106/288 Q |
|---|---|---|---|
| 3,287,147 | 11/1966 | Wilkinson .................... | 106/288 Q |

*Primary Examiner*—James E. Poer
*Attorney*—Frank R. Ortolani

ABSTRACT: A process is provided for making a solid solution of at least two quinacridone derivatives by drowning in highly turbulent water, a sulfuric acid solution of at least two of the derivatives to form a precipitate with a particle size smaller than 0.5 micron, and digesting the precipitate at a temperature of from about 40° C. to the boil for about 10 minutes to about 2 hours.

PROCESS FOR MAKING SOLID SOLUTIONS

CROSS-REFERENCES

This is a continuation-in-part of my copending application Ser. No. 738,784, filed June 21, 1968, now abandoned, which in turn is a continuation-in-part of my earlier application Ser. No. 515,251, now abandoned.

BACKGROUND OF THE INVENTION

Solid solutions of various quinacridone derivatives are known in the art and are disclosed in U.S. Pat. No. 3,160,510. The prior art stresses the use of organic solvents, particularly dimethylformamide, and reduction of particle size prior to treatment with the organic solvent such as disclosed in that U.S. patent. Normally the particle size reduction for the production of solid solution is accomplished by dispersion milling. In that process, quinacridone derivatives are milled with $Al_2(SO_4)_3$, balls and nails, in the presence of an organic solvent, for about 12–24 hours. The pigment and salt are then extracted with diluted $H_2SO_4$ and the solid solution is isolated by filtration and washing.

SUMMARY OF THE INVENTION

A process for making a solid solution of quinacridone derivatives is provided by drowning in highly turbulent water, a sulfuric acid solution of at least two of the derivatives to form a precipitate with a particle size smaller than 0.5 micron and thereafter digesting the precipitate at a temperature from about 40° C. to the boil for about 10 minutes to about 2 hours.

Turbulent flow referred to in this specification has been defined in the prior art (Detrick et al., U.S. Pat. No. 2,334,812) as the motion of a liquid in a pipe at a velocity greater than its critical velocity which is characterized by the presence of innumerable eddy currents, as distinguished from the straight lines of laminar flow where the liquid, although induced to rotate under agitation in currents, still flows for an appreciable time without interruption. The entire specification of that patent to Detrick et al. is hereby incorporated into the present specification by reference.

In "Principles of Chemical Engineering" by Walker, Lewis and McAdams, second edition, (1927) pp. 73–77, on page 74 it is pointed out that in case of every fluid flowing through a tube, as the velocity is increased some point is reached where the type of motion suddenly changes from straight line motion to a second type known as turbulent motion, which is characterized by the presence of innumerable eddy currents in the stream. On page 75 of the same text, "critical velocity" is defined as the velocity at which the type of motion changes from straight line to turbulent flow.

According to the process of this invention, velocities of the drowning liquid through the turbulent flow tube in excess of the critical velocity give an initial pigment particle of very small dimensions (as defined earlier), much finer than those obtained by the usual drowning methods. The high turbulence drowning method permits more accurate control of initial size and uniformity of pigment particles which is conducive to the formation of more uniform and complete solid solutions. The better outdoor durability of several products described in this specification compared to dispersion-milled counterparts is believed to be due to better and more uniform solid solutions obtained by the instant process.

DESCRIPTION OF TESTS

Outdoor Exposure Test

Comparative tint and metallic compositions are prepared using the pigment obtained by the instant process and a pigment obtained by the dispersion milling process. The chemical composition of the dispersion-milled pigment is within 2 percent of the chemical composition of the instant process. Five parts of the pigment to be tested are mixed with 95 parts $TiO_2$ to form a "tint" composition. Ten parts of aluminum are mixed with 90 parts of the pigment to be tested to form "Metallic I" and 25 parts of aluminum are mixed with 75 parts of pigment to form "Metallic II." A metal panel is painted with a paint pigmented with the dispersion milled pigment composition and another with a composition of the instant process. The top third of each panel is covered and the panels exposed to sunlight and the elements in Florida for 3 months to 1 year. After the exposure, the panels are washed and the covering is removed. Comparisons are made between the pigments in the exposed and unexposed states by numerical ratings in which 10 indicates no change and 0 indicates complete failure. Ratings can be accurately made within one-half unit.

X-ray Diffraction Patterns

X-ray diffraction patterns are the best way to show that a solid solution has been formed. The X-ray diffraction pattern of a mixture of quinacridone derivatives is a superimposition of the X-ray pattern of each component. In the case of a solid solution, one of the derivatives is the host and the remaining constituents are incorporated into the lattice of the host material. The X-ray diffraction pattern exhibited by the solid solution may be the same X-ray diffraction pattern exhibited by host material with slight variations in the position of the peaks as in Examples 1 and 2 which follow. In these examples when the formation of the solid solution is incomplete, i.e., a solid solution in the presence of excess of one ingredient, the X-ray pattern of the solid solution is superimposed on the X-ray pattern of that ingredient which did not go into solid solution. The patterns exhibited by the solid solution may also be a new pattern, different from that of any of the constituents. This is the case in the second part of Example 3 which follows.

The extent to which solid solution compositions are formed by the process of this invention is best demonstrated for the solid solution composition consisting of 60 percent quinacridone and 40 percent quinacridonequinone. Whereas a dispersion-milled product contains a substantial amount of quinacridone (30±10 percent) not in solid solution as shown by the presence of a typical quinacridone band in the diffraction X-ray pattern, the same composition prepared by the instant process gives a product showing substantially all quinacridone in solid solution of the quinacridonequinone lattice.

Particle Size

The particles which are precipitated during drowning are long, needle-shaped particles. The particle size referred to in this application is the length of the needles and can be determined by electron microscopy.

The following examples are for illustrative purposes only and are not meant to limit the invention in any manner. Unless otherwise designated, all references to parts are to parts by weight.

Example 1

Twenty-five parts of crude linear quinacridone and 75 parts of crude quinacridonequinone are dissolved together in 1000 parts of 96 percent $H_2SO_4$ at a temperature of 5–10° C. The solution is then introduced continuously through a small orifice into the center of a stream of cold water flowing under pressure through a constricted tube. The ratio of water to acid is about 10 to 1 and the temperature rise is about 15° c. The precipitate formed results in a strongly acid slurry which is digested at about 95° C. for about 1 hour, filtered, washed and dried at 60° C. to give 100 parts of a bright gold pigment. The X-ray diffraction pattern is essentially that of quinacridonequinone except for a slight shift in the positions of the peaks which indicates a solid solution of quinacridone in quinacridonequinone. Outdoor exposure tests are run on the pigment of this sample with the following results (9-month exposure):

| | Dispersion Milling | Instant Process |
|---|---|---|
| Tint | 3 | 9½ |
| Metallic I | 6 | 10 |
| Metallic II | 4 | 10 |

A sample of strongly acid slurry before heating, prepared as described in this example, is tested for particle size. The particles were found to be from about 0.2 micron to about 0.01 micron in length.

Example 2

Sixty parts of linear quinacridone and 40 parts of quinacridonequinone are added to 1000 parts of 98 percent $H_2SO_4$ and stirred at 5–10° C. until solution is complete. This solution is then introduced continuously through a small orifice into the center of a stream of cold water flowing under pressure through a constricted tube in a state of turbulent flow. The ratio of water to acid is about 10 to 1 and the temperature rise is about 15° C. The resulting strongly acid slurry is heated rapidly to about 70° C. and held at 70–80° C. for about 2 hours. The pigment is isolated by filtering, washing acid-free, and drying at 60° C. to give 100 parts of a dark red powder. An X-ray diffraction pattern of this product exhibits diffraction lines characteristic of quinacridonequinone and small amounts of quinacridone, indicating a nearly complete solid solution of quinacridone in quinacridonequinone. When this product is dispersed in a coating composition vehicle, panels made therefrom exhibit an attractive maroon color. The example is repeated except that instead of starting with linear quinacridone and quinacridonequinone, a quantity of 6,13-dihydroquinacridone is oxidized in aqueous suspension with sodium meta-nitrobenzenesulfonate to give a mixture of about 60 percent quinacridone and 40 percent quinacridonequinone. One hundred fifty parts of this mixture is then pulverized and dissolved in 1500 parts of concentrated $H_2SO_4$ at 8–10° C. and treated as described above. The X-ray pattern of this product is nearly devoid of diffraction lines due to quinacridone giving as complete a solid solution as we have ever observed. Outdoor exposure test results of the pigment of this example are as follows (12-month exposure):

| | Dispersion Milling | Instant Process |
|---|---|---|
| Tint | 9 | 10 |
| Metallic I | 10 | 9½ |

Example 3

In 1800 parts of 98 percent $H_2SO_4$ at 8°–10° C. 112.5 parts of 2,9-dimethylquinacridone and 37.5 parts of quinacridone are dissolved. The resulting solution is drowned into cold water under conditions of high turbulence as described in Example 1, using about 10 parts of water per part of acid. The strongly acid pigment slurry is heated at about 70° C. for 2 hours, filtered, washed free of acid, and dried at 60° C. to give 150 parts of a brilliant magenta-colored pigment. X-ray diffraction patterns indicate a solid solution has been formed. Outdoor exposure test results are as follows (9-month exposure):

| | Dispersion Milling | Instant Process |
|---|---|---|
| Tint | 10 | 10 |
| Metallic I | 10 | 10 |

A similar solid solution of somewhat yellower tint is made by this process using 60 parts of 2,9-dimethylquinacridone and 90 parts of quinacridone. In this case, a solid solution is obtained, the X-ray pattern of which is different from that of either of the constituents.

Example 4

Sixty parts of 4,11-dichloroquinacridone and 90 parts of quinacridone are dissolved together in 1500 parts of concentrated $H_2SO_4$ at 8–10° C. The resulting solution is drowned in cold water under conditions of high turbulence as shown in Example 1 using about 10 parts of water per part of acid. The strongly acid slurry is digested for 2 hours at about 75° C. and the pigment isolated by filtering, washing acid-free, and drying, to give 150 parts of a brilliant scarlet pigment which exhibits an X-ray diffraction pattern indicating a solid solution. Outdoor exposure test results are as follows (12-month exposure):

| | Dispersion Milling | Instant Process |
|---|---|---|
| Tint | 6 | 8 |
| Metallic I | 6 | 7 |

Example 5

Twenty-five parts of crude linear quinacridone, 45 parts of crude 4,11-difluoroquinacridone and 30 parts of crude 4,11-dichloroquinacridone are dissolved together in 1000 parts of 96 percent $H_2SO_4$ at 5–10° C. The resulting solution is drowned in cold water under conditions of high turbulence as shown in Example 1 using about 10 parts of water per part of acid. The strongly acid slurry obtained is digested for 2 hours at about 75° C. and the pigment isolated by filtering, washing acid-free, and drying, to give 100 parts of a brilliant orange powder which has an X-ray diffraction pattern indicating a solid solution. Outdoor exposure test results are as follows (12-month exposure):

| | Dispersion Milling | Instant Process |
|---|---|---|
| Tint | 4 | 9 |
| Metallic I | 8 | 9½ |

THE REACTANTS

The reactants may be quinacridone or its derivatives including quinacridonequinone, 4,11-dichloroquinacridone, 2,9-dichloroquinacridone, 4,11-difluoroquinacridone, 2,9-difluoroquinacridone, and combinations of these derivatives. The derivatives are dissolved in sulfuric acid solution from which they may be later precipitated to obtain the smaller particle size critical to the invention. The sulfuric acid should be from about 95 percent to 98 percent $H_2SO_4$ and is used in amounts of about 10 parts acid per part of pigment to insure complete solution of the derivatives within a reasonable period of time. but it is not critical beyond the necessity that solution be complete. More dilute acid may be used with longer stirring time but the economic penalty involved makes the use of the more concentrated acids preferable. It is also preferred that the acids be cold, that is, at a temperature not higher than about 30° C.

THE DROWNING

It is critical to the invention that the size of the precipitated quinacridone compounds be no larger than 0.5 micron and it is preferred that they be between about 0.1 micron and about 0.005 micron. This is accomplished by introducing the acid solution into water in a zone of extremely high turbulence, for instance, the center of a stream of water flowing under pressure through a constricted tube. The precipitation under these turbulent conditions insures a fine particle size of less than 0.5 micron which results in a better solid solution than can be obtained through dispersion milling. While applicant does not wish to be bound to any theory of operation, it is believed that the smaller particles obtained with high turbulence drowning have a higher energy, and to return to a lower energy state, they tend to grow rapidly by forming solid solutions. The larger particles tend to grow at the expense of the smaller ones, and therefore, the smaller the particle size, the more uniform and complete the solid solution. It is also believed that the high turbulence particle forms a solid solution of more ordered distribution with an energy state lower than that of a random distribution. This ordered distribution results in higher lightfastness than is possible with dispersion-milled particles which yield a random, less uniform solid solution. The smaller particles also enable the formation of the solid solutions to proceed at lower temperatures under atmospheric pressure.

Effective results have been obtained under a wide variety of conditions with respect to the degree of dilution and the temperature rise accompanying the dilution. The ratio of acid to water in the drowning step controls the temperature rise during this step. The use of about 10 parts of water per part of acid is a convenient ratio for drowning which gives a temperature rise in the order of about 15° C. This has been found to give excellent results. Such a process is readily operable on a large scale where it is possible to pump the acid solution under pressure. In small scale laboratory operations, it is more difficult to obtain efficient mixing wit this ratio and operations usually require considerably larger amounts of water with lower temperature rise.

THE DIGESTION

The heating step following the precipitation of the quinacridone derivatives is also critical to the invention. The exact temperature at which this heating must take place varies with the combination of quinacridone derivatives used, but in all cases the temperature must be at least 40° C. and may be as high as the boil. It is preferred that a temperature of about 75° C. to about 90° C. be used. This digestion step also requires appreciable time of at least 10 minutes for the formation of the solid solution. For best results, it is preferred that the digestion be carried out for about 1 hour at the preferred temperatures. It is possible, however, that the heating period may be extended to as much as two hours or more.

The final isolation of the pigment from the acid slurry after the digestion step is accomplished by conventional means such as simple filtration, washing free of acid and soluble salts, and finally drying it at a convenient temperature, for instance, about 80° C. The products of such operations are found to be highly desirable pigments with superior lightfastness and high tinctorial strength.

It is evident from X-ray diffraction patterns that a better solid solution is obtained by the instant process than by that of the prior art dispersion milling process. The pigment of the second part of Example 2 is nearly indistinguishable from the gold pigment in Example 1 in that there is no quinacridone peak in the X-ray diffraction pattern. This indicates that all the quinacridone has become part of the solid solution. In the maroon pigment of the prior art or dispersion milling process, an amount of quinacridone remains as pure quinacridone, which shows up as a medium quinacridone peak on the X-ray diffraction pattern.

Other outstanding advantages of this invention are the elimination of the need for any use of organic solvents in the formation of the desired solid solutions of the quinacridone derivatives; it is possible to incorporate a larger amount of quinacridone derivatives into a smaller amount of host derivatives, i.e., in the instance of the maroon pigment of Example 2, it is possible that as much as 65 percent quinacridone may be put into a solid solution of 35 percent quinacridonequinone which is the host material.

The present process requires no isolation of product after drowning and prior to completion of solid solution formation. Because of the very small size and high energy content of the initial pigment particles, good solid solution formation proceeds upon heating the high turbulence tube effluent at 40° to 100° C. under atmospheric pressure. The products obtained in this manner show excellent transparency and are, therefore, particularly suitable for pigmentation of automotive finishes.

Further modifications and variations of this invention will be apparent to one skilled in the art upon reading this disclosure without departing from the inventive concept.

What is claimed is:

1. A process for making a solid solution of at least two quinacridone derivatives comprising:
   a. drowning in water flowing at a velocity in excess of the critical velocity to provide high turbulence, a sulfuric acid solution of at least two said derivatives to form a precipitate having a particle size smaller than 0.5 micron; and
   b. digesting said precipitate in said water and acid solution at a temperature of from about 40° C. to the boil for about 10 minutes to about 2 hours.

2. The process of claim 1 wherein said sulfuric acid solution is about 96 percent to about 98 percent $H_2SO_4$ and is used in the proportion, by weight, of about 6 to about 10 parts per part of said derivatives.

3. The process of claim 2 wherein the flow of said water is constricted while at a high velocity to obtain said turbulence.

4. The process of claim 3 wherein said temperature is from about 75° C. to about 95° C.

5. The process of claim 4 wherein said digesting is carried out for about 1 hour.

6. The process of claim 5 wherein the turbulence is sufficient to produce a precipitate having a particle size smaller than 0.1 micron.

7. A process for making a solid solution of linear quinacridone and quinacridonequinone in pigmentary size comprising drowning in water flowing at a velocity in excess of the critical velocity to provide high turbulence, a sulfuric acid solution of linear quinacridone and quinacridonequinone to form a precipitate thereof having a particle size smaller than 0.5 micron, and digesting said precipitate in said water and said acid solution at a temperature of from about 40° C. to the boil for about 10 minutes to about 2 hours.